United States Patent [19]

Auberry et al.

[11] Patent Number: 5,032,330
[45] Date of Patent: Jul. 16, 1991

[54] METHOD OF FOOTWEAR MANUFACTURE

[75] Inventors: Horace Auberry; Sven Oberg, both of Waynesville, N.C.

[73] Assignee: Ro-Search, Inc., Waynesville, N.C.

[21] Appl. No.: 369,718

[22] Filed: Jun. 22, 1989

[51] Int. Cl.⁵ .............................................. B29C 67/22
[52] U.S. Cl. ................................. 264/46.5; 264/46.6; 264/244
[58] Field of Search ..................... 264/46.5, 46.6, 244; 425/119, 129.2

[56] References Cited

U.S. PATENT DOCUMENTS

| | | | |
|---|---|---|---|
| 3,474,496 | 10/1969 | Klee | 264/244 |
| 3,758,903 | 9/1973 | Auberry et al. | 12/1 A |
| 4,302,416 | 11/1981 | Rudolf et al. | 264/244 |
| 4,543,222 | 9/1985 | Ehrlich | 264/46.5 |
| 4,562,606 | 1/1986 | Folschweiler | 264/244 |
| 4,854,841 | 8/1989 | Graf et al. | 264/244 |

FOREIGN PATENT DOCUMENTS 2139942 11/1984 United Kingdom ................ 264/244

Primary Examiner—Robert A. Dawson
Assistant Examiner—Allan R. Kuhns
Attorney, Agent, or Firm—Jay M. Cantor

[57] ABSTRACT

A method of manufacturing footwear and the footwear wherein the footwear is manufactured by providing a mold having a mold cavity, placing a sole member in the bottom of the mold cavity, placing a foamable material over the sole member within the mold cavity, providing a last having shoe upper means thereon, positioning the shoe upper means against the mold cavity to form an enclosed space therein formed by the shoe upper means and the sole member and foaming the foamable material within the enclosed space. The footwear comprises upper means and a sole member secured to the upper means, the sole member comprising a prevulcanized sole portion extending to and engaging the upper means to form a spew-proof cavity therebetween and a foamed material filling the cavity.

5 Claims, 2 Drawing Sheets

METHOD OF FOOTWEAR MANUFACTURE

BACKGROUND OF THE INVENTION

1. Field of the Invention

This invention relates to footwear and a method of manufacture thereof.

2. Background of the Invention

In the manufacture of footwear, as set forth in U.S. Pat. No. 3,758,903, it is known to provide a loading station of a sole attaching device wherein the upper is placed on a last and secured in its position thereafter by a side frame forming part of the sole mold cavity. After locking the side frame against the last, the unit is moved to a molding station to close a sole cavity where, preferably by injection molding, a sole is formed and bonded to the bottom margin of the upper. The sealing of the sole cavity against the upper is obtained by a lip of the side frame which has to be relatively heavy to withstand the pressure of the sole material.

Also, in the manufacture of stitch-down shoes, it is known to use a lip plate separated from the sole cavity member wherein the lip plate is provided with a blanking knife edge. The lip plate serves as an anvil plate and is, therefore, subjected to heavy pressure which is required to cut through both the upper material and the stitch-down midsole.

It is still further known from U.S. Pat. No. 3,965,517 to provide a prewelted upper which is lasted without structural insole or midsole on the last of a sole molding device having a divided lip plate. The lip plate is used to locate and position the welt in the desired final position while the shoe bottom is freely accessible for visual inspection and before the unit of last, upper, lip plate and lip plate positioning means are brought into juxtaposition with the sole molding cavity parts comprising a side wall and a bottom wall member. In this position with an enclosed cavity, the welt is clamped between the lip plate and the rim of the molding cavity to assure both a reliable sealing of the molding cavity and also a spacing in the form of an air gap between the lip plate and the cavity rim. This spacing prevents essential heat transfer from the cavity member to the lip plate. Even if the cavity member, such as the side frame, is maintained at high heat for rapid vulcanization of the sole elastomer (rubber), the lip plate remains at a much lower temperature, thus enabling easy handling of the lip plate during loading, lasting and unloading of the mold last.

In the use of sole attaching devices in which the upper, mounted on a last, is moved from a loading to a sole attaching station, the invention provides for the use of a light lip plate not only to facilitate the handling in placing and locking the lip plate against the upper, but also the use of the lip plate so that heavy pressure against the lip plate is avoided. This prevents distortions of the lip plate and the danger of damage to the upper and/or faulty sealing. At the same time, it is possible to refrigerate the sole cavity member, comprising both side and bottom walls, before moving the cavity member to the molding position of an injection molding sole attaching device.

It is also known to place a pre-vulcanized rubber tread sole in the mold cavity and inject polyurethane into the mold to make a bond to both the tread sole and the upper.

Relative to rubber as a soling material, prior art use of polyurethane has displayed poor oil resistance, poor crack resistance, poor skid resistance, poor abrasion resistance, particularly when expanded significantly, and poor flame resistance.

SUMMARY OF THE INVENTION

In accordance with the present invention, there is provided a method of manufacturing footwear using polyurethane wherein the above noted problems and deficiencies of the prior art are minimized, wherein the performance characteristics of the sole are entirely dependent upon vulcanized rubber, wherein the lightness and cushioning effect of polyurethane is retained without the problem of polyurethane spillage or flash and wherein the low cost of a highly expanded material is provided.

Briefly, in accordance with the present invention, there is provided a shoe manufacturing apparatus of the type set forth in U.S. Pat. No. 3,965,517 having a sole cavity member in the form of a mold. Also provided is a last to which an upper is secured, the upper having a welt stitched thereto. A tread sole of prevulcanized rubber is placed in the bottom of the sole cavity member with the mold separated from the last and upper or in the lowered position so that when the lasted upper is later brought into position against the sole cavity member there is a completely enclosed space between the tread sole and the upper. The polyurethane is then injected or poured over the sole and into this space and the sole cavity member is then raised so that the lip of the tread sole is pressed firmly against the welt, thereby retaining the polyurethane in the cavity created by the tread sole, the upper, the welt and the last. This procedure is made possible without spilling polyurethane because the polyurethane is not injected with as great a force as PVC and the initial volume of the polyurethane is only one-third of the final fully assembled volume. The mold is sealed so perfectly with the rubber sole to the rubber welt that there is virtually no polyurethane spew. It does not appear that bonding of the sole to the welt is critical since there is nothing that can come loose due to the polyurethane strongly adhering to all other surfaces of the welt and tread sole. However, should one be concerned by this possible lack of bond and not wish to bother cementing the sole and welt parts together, the unbonded surface can be cut away in edge trimming with a radius cutter.

It should be understood that the above described method can be used in conjunction with unwelted footware, it merely being necessary that the sole and the upper mate in a manner to provide a seal therebetween whereby an enclosed chamber is formed to hold the polyurethane therein after expansion of the polyurethane. It should further be understood that sole materials other than vulcanized rubber can be used, such as, for example, polyvinylchloride and expanded polyvinylchloride.

DESCRIPTION OF THE PREFERRED EMBODIMENTS

Figure 1:
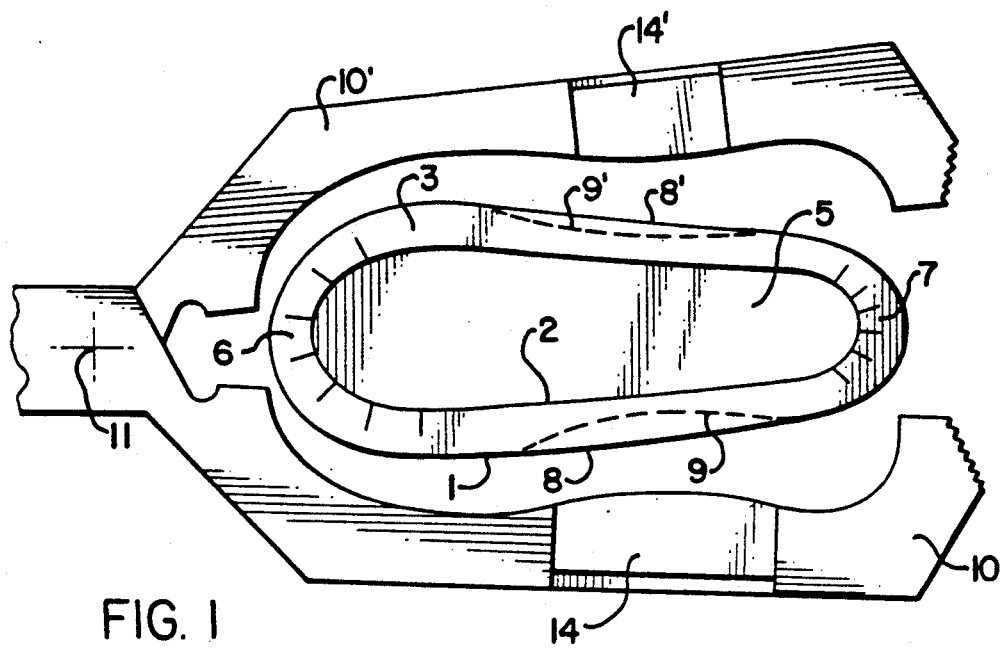
FIG. 1 is a schematic top view of an upper on a last prior to closing of the lip plate in accordance with the present invention.
Figure 2:
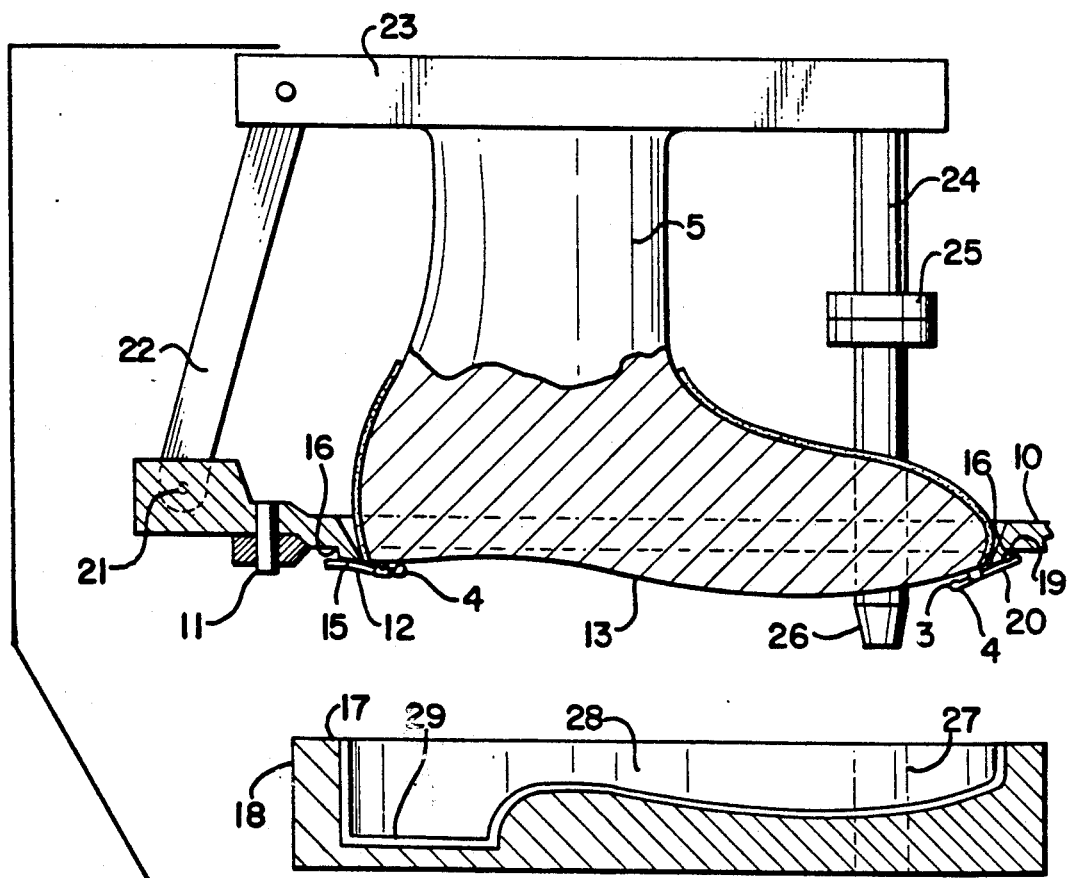
FIG. 2 is a side view, partly in section, of the upper on the last with the lip plate in closed position above the sole cavity member and a prevulcanized rubber tread sole in the sole cavity member.

Referring first to FIGS. 1 and 2, an upper 1, provided at the inner edge 2 of its lasting margin 3 with a lasting string 4, is lasted in known manner on the last 5. Tightening of the lasting string 4 causes the lasting margin 3 to stretch and shape the toe section 6 and the heel section 7 with the shank sections 8 and 8' remaining relatively straight rather than assuming the inturned curvature 9 and 9' indicated by dotted lines as the contour of the last sole.

Figure 3:
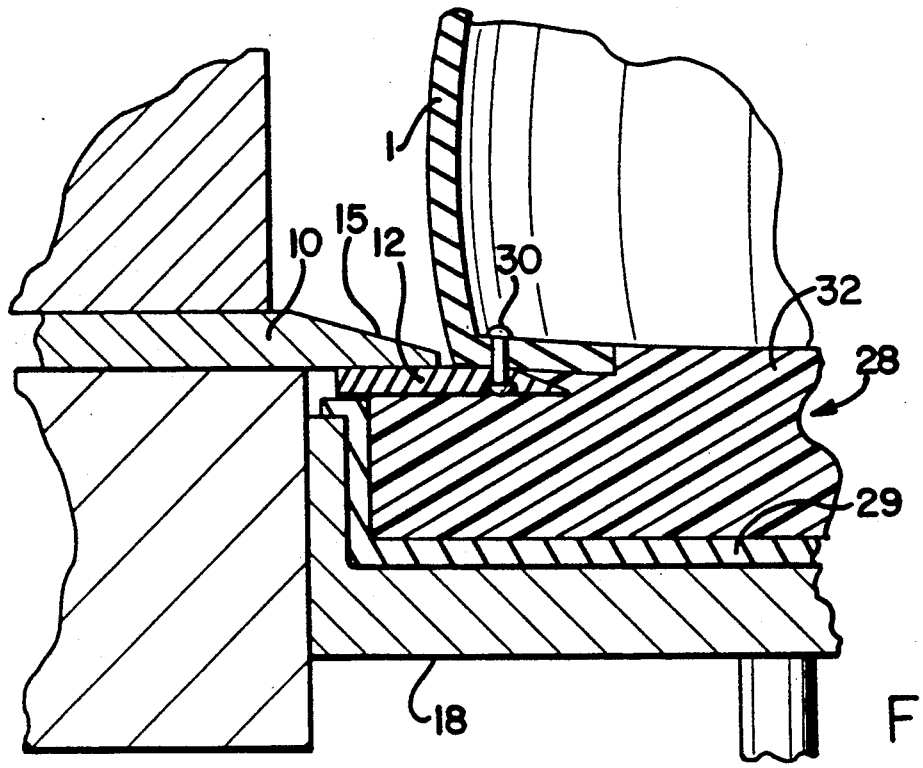
FIG. 3 is a side view, partly in section, of the upper on the last with the lip plate in closed position in accordance with the present invention.

A lip plate comprising the halves 10 and 10' which are hinged together at hinge 11 for opening and closing and which are provided with a closing device (not shown) having a common cam or toggle action, is placed against the shoe bottom and closed as shown in FIG. 2. The shoe bottom is provided with a welt 12 which is secured to the upper by a welt/upper stitch 30 (FIG. 3). The lip plate 10, 10' enters the crease between welt 12 and upper 1 and forces the shank sections of the lasting margin 3 inwardly to conform with the contour of the last sole 13. For soft leather uppers, it is sometimes desirable to obtain additional inward movement. The lip plate 10, 10' is then provided with shank sections 14 and 14' which are movable in relation to the toe and heel sections of the lip plate.

The lip plate 10, 10' has a surface 15 for support of the welt 12 and a cutting edge 16 for shearing action with the edge 17 of the sole cavity member 18 in the event trimming of the welt during sole attaching is required. Relatively little force is required for the shearing action which occurs consecutively over the shearing contour as compared to blanking against an anvil plate where the entire cutting occurs simultaneously. When the trimming of the welt 12 is carried out with the common sole edge finishing, the lip plate 10, 10' may be provided with means, such as grooves, ridges, pins, etc. to locate the outer edge of the welt which is removed in the trimming operation. The groove 19 may serve for locating the welt having a ridge 20.

To facilitate handling, the entire lip plate 10,10' is connected by means of the lever 22 and the hinge 21 to the last carrier plate 23. Posts 24 with cam locking means 25 are provided with one part of each post, of which four may be placed around the last, being fastened to the last carrier plate 23, with the other part fastened to the lip plate 10, 10'. To assure that the shearing edges 16 and 17 meet correctly, the posts 24 are extended beyond the lip plate 10, 10' to act as guide pins 26 with corresponding holes 27 in the bottom part 18 which contains the cavity 28.

Figure 4:
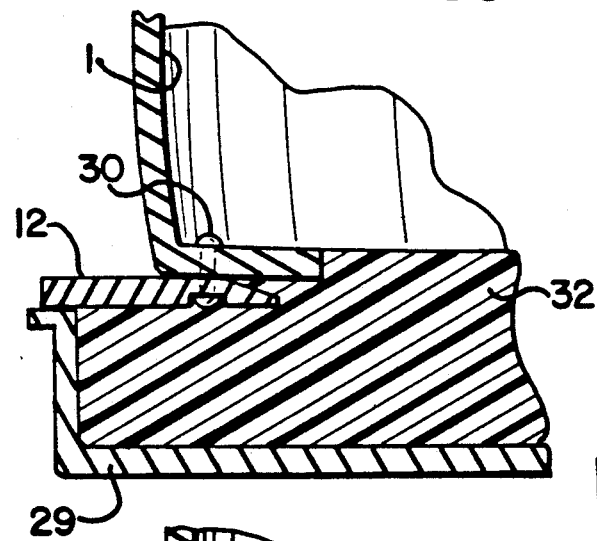
FIG. 4 is a side view, partly in section, of upper on a last after removal of the shoe from the sole cavity member.

In operation, with reference to FIGS. 1 to 4, with the last 5 and sole cavity member 18 separated, a pre-vulcanized rubber tread 29 is placed in the bottom of the sole cavity member as shown in FIG. 2, the sole cavity member extending along all of the interior side walls thereof. As can be seen in FIGS. 3 and 4, the tread 29 can include a flange portion which extends out of the mold cavity or space 28 and along an upper surface of the sole cavity member 18. The sole cavity is preferably heated to about 125 degrees F. to stabilize the succeeding polyurethane reaction. The components which will form the expanded polyurethane (a polyol and an isocyanate) 32 (FIG. 3) are then poured or injected into the space 28 and the lasted upper 1 is then lowered relative to the sole cavity member 18 to provide an enclosed and essentially spew-proof space or cavity 28 between the tread 29 and the sole of the last 5. In this state, the sole 29 will be in contact with the welt 12 as shown in FIG. 3. The polyurethane foams with a chemical exothermic reaction, causing the material to expand and subsequently harden. It follows that the sole 29 frictionally engages and possibly bonds to the welt 12 to form an enclosed spew-proof cavity for the polyurethane 32. Also, the polyurethane 32, which initially amounts to about one third (⅓) of its expanded volume is caused to expands to fill the space 28 without spewing therefrom. The polyurethane does not spill because it can be injected or poured over the sole 29 under relatively low force. Furthermore, the mold formed by the sole cavity member 18 with sole 29 therein, the welt 12 and the sole of the last 5 is sealed so perfectly with the rubber sole 29, welt 12 and sole of the last 5 that there is virtually no polyurethane spew.

To avoid the possibility that the sole 29 and welt 12 not bond to each other, the upper lip of the sole and the welt are coated with a contact cement to provide such bond. This bonding is not critical since there is nothing which can come loose because the polyurethane is strongly adhering to all other surfaces of the welt and sole.

Figure 5:
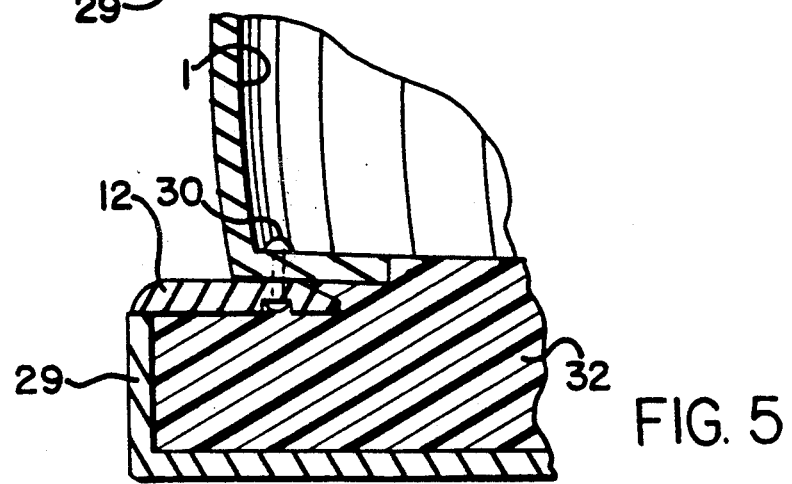
FIG. 5 is a side view as in FIG. 4 of an alternate embodiment of a shoe in accordance with the present invention.

To avoid use of the contact cement, as shown in FIG. 5, the unbonded surface can be cut away in edge trimming with a radius cutter to provided a rounded shape at the junction of welt 12 and sole 29. The polyurethane will adhere to all of the surfaces with which it comes in contact.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications

We claim:

1. A method of manufacturing footwear comprising the steps of:
   (a) providing a mold having a mold cavity;
   (b) placing a resilient sole member in said mold cavity conforming to the shape of said mold cavity and extending along the entire perimeter of the outer edge of said cavity;
   (c) placing a foamable material over said resilient sole member and in a portion of said mold cavity;
   (d) providing a last having thereon a shoe upper;
   (e) securing a resilient welt to said shoe upper;
   (f) positioning said welt against substantially the entire portion of said resilient sole member extending along the perimeter of said outer edge of said cavity to form an enclosed space among said last, said welt and said resilient sole member with said foamable material disposed within said enclosed space; and
   (g) then foaming said foamable material within said enclosed space to retain the foamed material substantially entirely within said enclosed space, wherein step (b) further includes disposing a portion of said resilient sole member external to said mold cavity to provide a flange portion of said resilient sole member external of said mold cavity and wherein step (e) includes positioning said welt against said flange portion.

2. A method as set forth in claim 1 wherein said foamable material is polyurethane.

3. The method of claim 1 wherein said resilient welt is secured to said shoe upper prior to step (f).

4. The method of claim 1 wherein step (b) comprises placing a prevulcanized rubber member in said mold.

5. The method of claim 3 wherein step (b) comprises placing a prevulcanized rubber member in said mold.

* * * * *